US006738367B1

(12) United States Patent
Seo

(10) Patent No.: US 6,738,367 B1
(45) Date of Patent: May 18, 2004

(54) APPARATUS FOR RECEIVING SIGNALS IN A BASE STATION FOR CELLULAR RADIO TELECOMMUNICATION SYSTEM

(75) Inventor: Cheol-Soo Seo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 09/483,194

(22) Filed: Jan. 14, 2000

(30) Foreign Application Priority Data

Jan. 23, 1999 (KR) .......................................... 1999-2065

(51) Int. Cl.$^7$ ............................................... H04B 7/216

(52) U.S. Cl. ...................... 370/342; 370/441; 375/147; 455/73; 455/132

(58) Field of Search ................................ 370/342, 335, 370/437, 441, 320, 328, 276, 278, 282, 339; 375/130, 144, 147, 148, 143, 316, 136, 140, 267, 337; 455/63.4, 73, 88, 83, 466, 500, 524, 525, 526, 78, 132

(56) References Cited

U.S. PATENT DOCUMENTS

| 5,832,368 A | * | 11/1998 | Nakano et al. ................ 455/63 |
| 5,862,142 A | * | 1/1999 | Takiyasu et al. ............. 370/480 |
| 5,918,181 A | * | 6/1999 | Forster et al. ........... 455/456.1 |
| 5,953,659 A | * | 9/1999 | Kotzin et al. ............. 455/422.1 |
| 6,091,970 A | * | 7/2000 | Dean ........................ 455/562.1 |
| 6,317,882 B1 | * | 11/2001 | Robbins ....................... 725/34 |
| 6,535,721 B1 | * | 3/2003 | Burke et al. ................ 455/137 |

* cited by examiner

Primary Examiner—Phirin Sam
(74) Attorney, Agent, or Firm—Cha & Reiter, LLC

(57) ABSTRACT

An apparatus for receiving signals in a base station of a CDMA communication system including a first and a second subordinate base station (Pico-BTS) having a small capacity, each including a transmission-reception antenna, a duplexer connected to the antenna, a transmitter for transmitting a signal through the duplexer to the antenna, a main receiver for receiving a signal from the antenna through the duplexer, and an auxiliary receiver, wherein the main receiver of each of the first and second Pico-BTS divides the signal from the antenna into two subordinate signals, one of which is applied to the main receiver in a normal way and the other is applied to the auxiliary receiver of another Pico-BTS.

15 Claims, 4 Drawing Sheets

APPARATUS FOR RECEIVING SIGNALS IN A BASE STATION FOR CELLULAR RADIO TELECOMMUNICATION SYSTEM

CLAIM OF PRIORITY

This application makes reference to, incorporates the same herein, and claims all benefits accruing under 35 U.S.C. Section 119 from an application for APPARATUS FOR RECEIVING SIGNALS IN A BASE STATION FOR CELLULAR RADIO TELECOMMUNICATION SYSTEM filed earlier in the Korean Industrial Property Office on Jan. 23, 1999 and there duly designated Serial No. 2065/1999.

BACKGROUND OF THE INVENTION

1. Field of the Invention

The present invention relates to a cellular radio telecommunication system, and more particularly, a base station having a plurality of subordinate base stations with low capacity (Pico-BTS) for processing the multiple frequency channels.

2. Description of the Related Art

A geographic area served by a cellular mobile communication system is divided into a group of smaller geographic areas or cells, each cell having a base station for providing communication service to a mobile phone or a portable instrument within the cell. Additionally, all the base stations are controlled by a mobile switching center (MSC) to enable the communication between the cells. In the cellular communication system employing the CDMA (Code Division Multiple Access), the signals are sent in the same frequency band simultaneously. Accordingly, the signals are either selected or rejected at the receiver end through the process of recognizing the user-specific signature waveform, which is generated by an assigned spreading code technique. As the process of multiplying the signal by the code sequence causes the power of the transmitted signal to be spread over a wide range of bandwidth, the CDMA is sometimes referred to as spread-spectrum multiple access (SSMA). Moreover, the frequency management scheme, which is a necessary feature of the FDMA (Frequency Division Multiple Access), is eliminated in the CDMA system. Accordingly, in the CDMA system, when the user of a mobile terminal wishes to access a communication channel, the mobile terminal is assigned with a code and the communication signal is immediately transmitted, instead of being stored until a frequency slot becomes available for the transmission as in the FDMA system.

Although a base station can serve a number of subscribers with a single frequency channel in the CDMA system, the system needs to be provided with additional frequency channels as the number of subscribers exceeds the channel capacity. In order to employ the multiple frequency channels, the base station must be provided with an MCPA (Multi Carrier Power Amplifier) or MCC (Multi Channel Combiner). Yet, these components increase the size of the base station. For this reason, the cell that has been served by a single base station having a low capacity is equipped with additional subordinate base stations to provide the multiple frequency channels in the system. However, as the base station with a low capacity is provided with a transmission-reception antenna and an exclusive reception antenna in order to achieve the reception diversity, each respective subordinate base station requires another set of the transmission-reception antenna and the exclusive reception antenna, as shown in FIG. 1. Thus, the expansion of the base stations incorporating these antennas to accommodate the multiple frequency channels is very costly.

FIG. 1 illustrates the conventional base station employing the multiple frequency channels having the first through the fourth subordinate base stations (110, 160, 170 and 180) to support the first through the fourth frequency channels, respectively. Each subordinate base station includes a transmission-reception antenna (112, 161, 171 or 181); an exclusive reception antenna (114, 162, 172 or 182); a transmitter (130, 164, 174 or 184); a main receiver (140, 165, 175 or 185); a subordinate receiver (150, 166, 176 or 186); and, a duplexer (120, 163, 173 or 183) connecting the antennas (112 and 114), (161 and 162), (171 and 172), or (181 and 182) with the transmitter, and the main and subordinate receivers. Thus, the conventional cellular system requires each additional subordinate base station to be equipped with a separate set of the transmission-reception antenna and the exclusive reception antenna 114, 162, 172 or 182 which increase the manufacturing cost.

SUMMARY OF THE INVENTION

It is an object of the present invention to provide an apparatus and method for a base station of the CDMA communication system to increase the number of subordinate base stations to accommodate the multiple frequency channels without incorporating additional exclusive reception antennas.

According to an embodiment of the present invention, an apparatus for receiving signals in a base station of a CDMA communication system includes a first and a second subordinate base station (Pico-BTS) with a low capacity, each including a transmission-reception antenna; a duplexer connected to the antenna; a transmitter for transmitting the signal to the antenna through the duplexer; a main receiver for receiving the signal from the antenna through the duplexer; and, an auxiliary receiver, wherein the main receiver of the first and the second Pico-BTSs divides the signal from the antenna into two subsets of signals, one of the signal is received by the main receiver and the other is delivered to the auxiliary receiver of the other Pico-BTS via external port.

The foregoing and other objects, features, and advantages of the invention will be apparent from the following more particular description of preferred embodiments as illustrated in the accompanying drawings. The drawings are not necessarily drawn to scale, with the emphasis placed upon illustrating the principles of the invention.

A BRIEF DESCRIPTION OF THE ATTACHED DRAWINGS

A DETAILED DESCRIPTION OF THE PREFERRED EMBODIMENT

In the following description, for the purposes of explanation rather than limitation, specific details are set forth, such as particular architecture, interfaces, techniques, etc., in order to provide a thorough understanding of the present invention. However, it will be apparent to those skilled in the art that the present invention may be practiced in other embodiments which depart from these specific details. Moreover, for the purpose of clarity, detailed descriptions of well-known devices, circuits, and methods are omitted so as not to obscure the description of the present invention with unnecessary detail.

Figure 1:
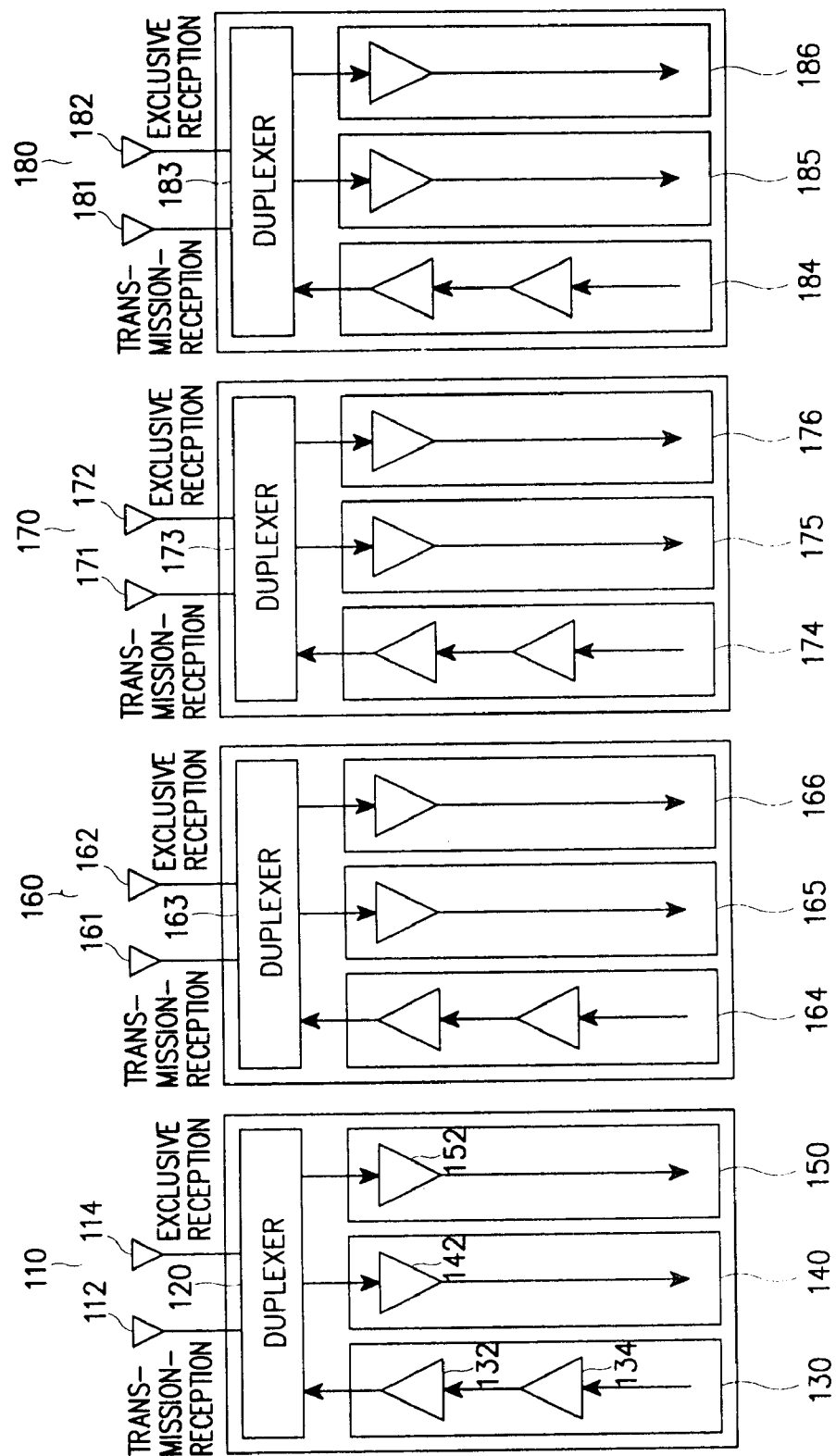
FIG. 1 is a schematic diagram for illustrating the structure of a conventional base station to provide services for multiple frequency channels.
Figure 2:
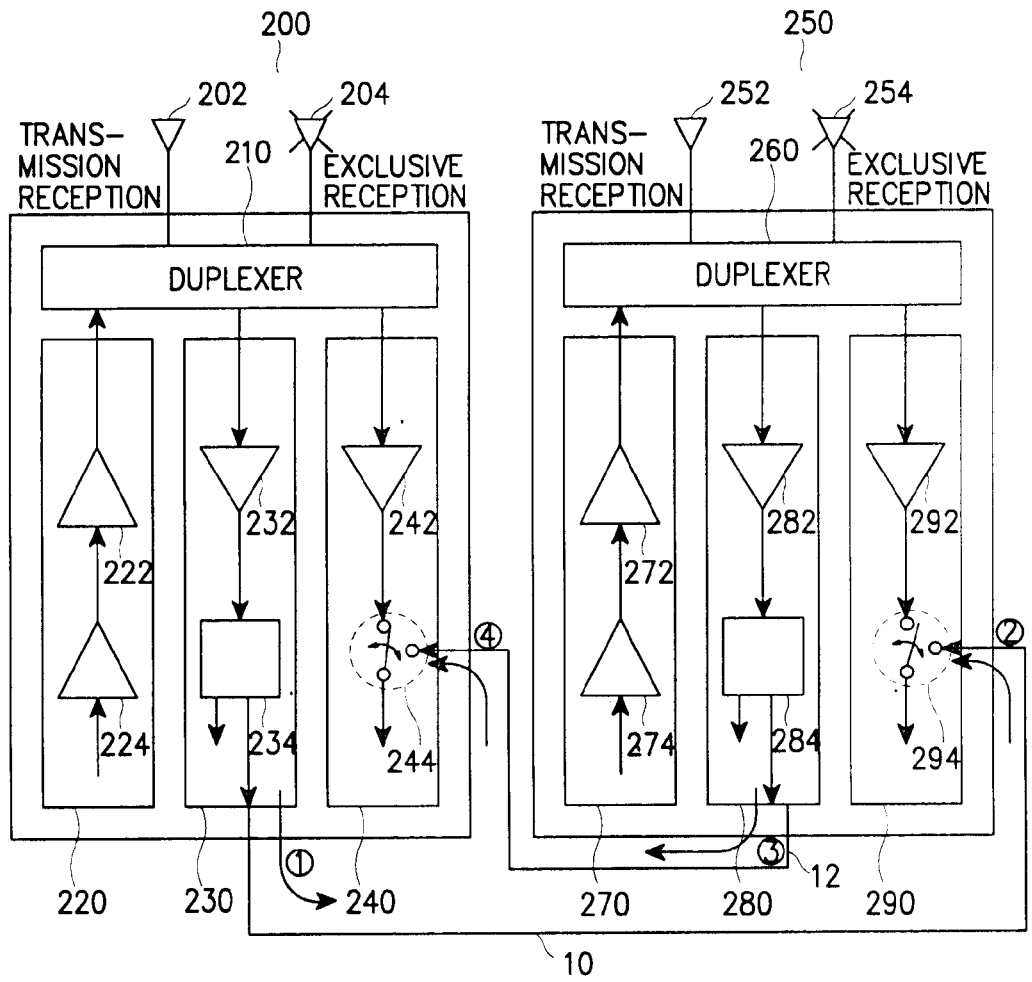
FIG. 2 is a schematic diagram for illustrating the structure of a base station employing the multiple frequency channels according to an embodiment of the present invention.
Figure 3:
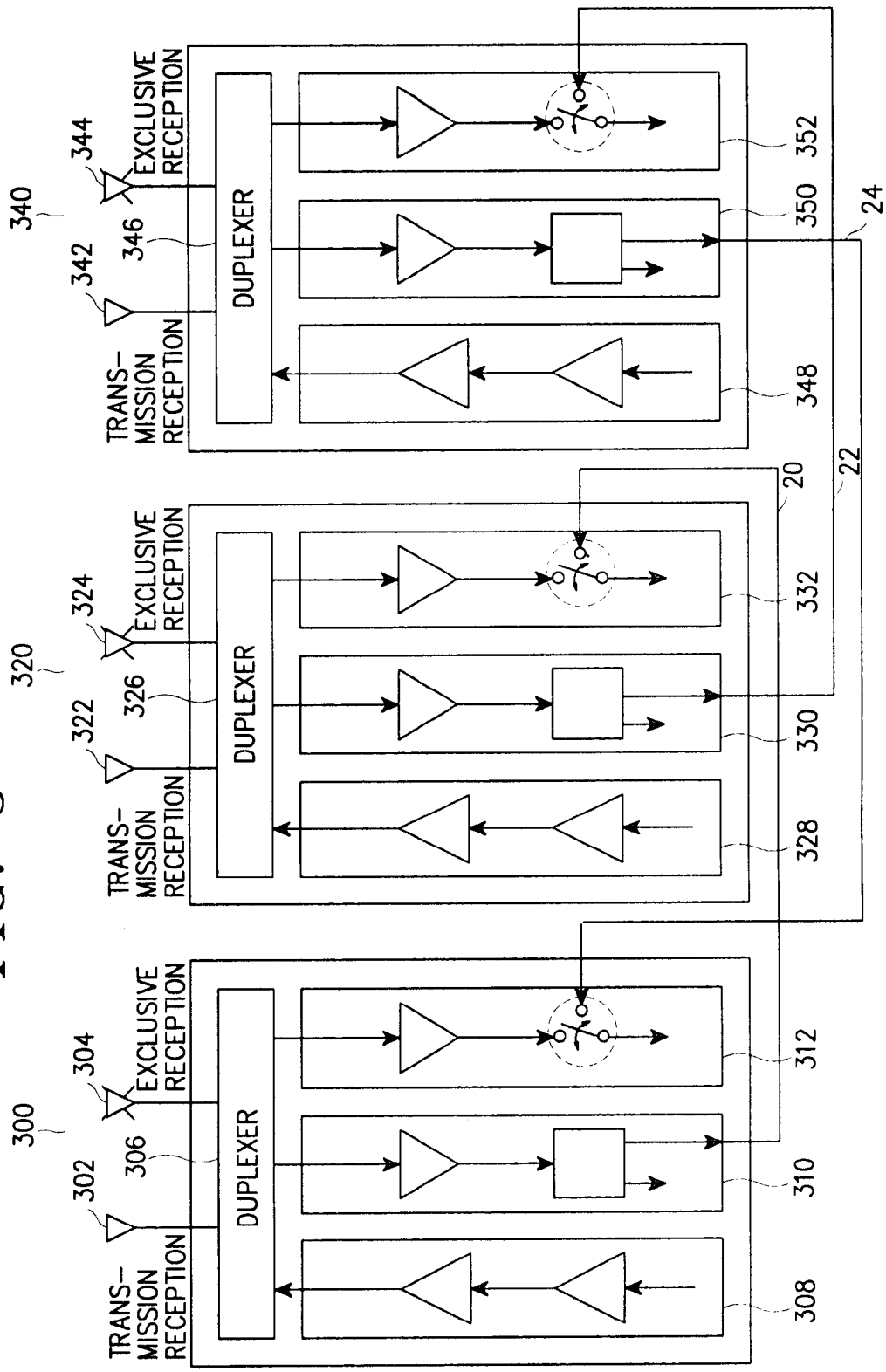
FIG. 3 is a schematic diagram for illustrating the structure of a base station employing the multiple frequency channels according to another embodiment of the present invention; and, FIG. 4 is a schematic diagram for illustrating the structure of a base station employing the multiple frequency channels according to another embodiment of the present invention.
Figure 4:
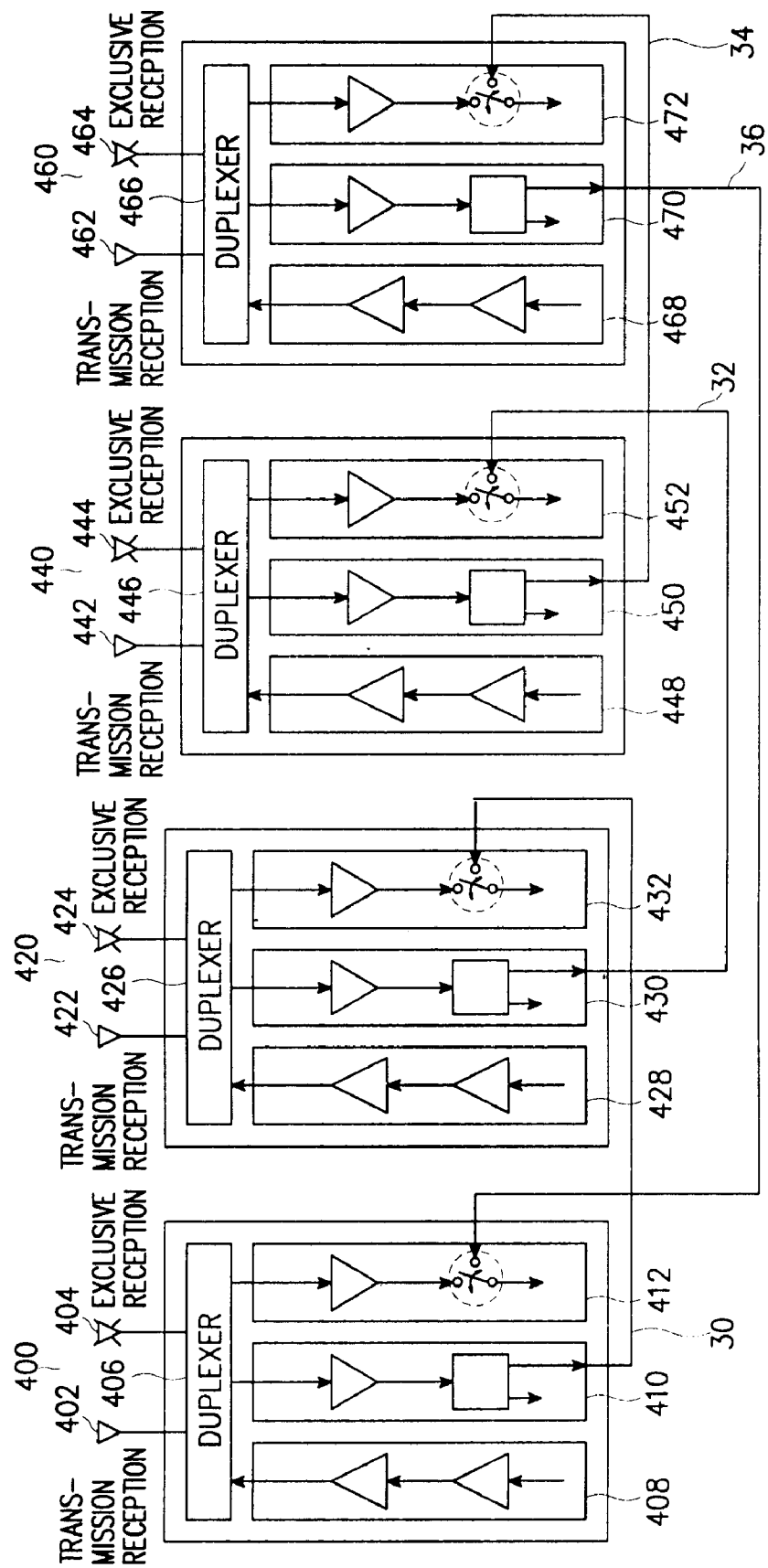

In accordance with the embodiment of the present invention as shown in FIGS. 2 through 4, an exclusive reception antenna is indicated by "X" which can be eliminated because the main receiver of a Pico-BTS distributes the signal received through the transmission-reception antenna into two subsets of signals, one of which is applied to the main receiver in a normal way and the other is applied to the auxiliary receiver of another Pico-BTS.

In FIG. 2, a base station providing communication service for multiple frequency channels includes a first subordinate base station 200 (hereinafter referred to as "Pico-BTS") for employing the first frequency channel, and a second Pico-BTS 250 for employing the second frequency channel. Each of the Pico-BTSs 200 and 250 includes a transmission-reception 202 (or 252), a duplexer 210 (or 260) connected to the transmission-reception antenna 202 (or 2520, a transmitter 220 (or 270)) for transmitting the signal through the duplexer to the transmission-reception antenna 202 (or 252), a main receiver 230 (or 280) for dividing the signal received from the transmission-reception antenna through the duplexer, and an auxiliary receiver 240 (or 290) for receiving the signal from an exclusive reception antenna 204 (or 254) or from the main receiver of the other Pico-BTS.

Each of the main receivers 230 (or 280) of the first and second Pico-BTSs 200 (or 250) delivers a portion of the divided signal to the auxiliary receiver 290 (or 240) of the other Pico-BTS through a cable 10 (or 12), as shown in FIG. 2. The duplexer 210 (or 260) permits the alternate transmission and reception of signals using the same transmission-reception antenna 202 (or 252). In effect, the duplexer serves as a fast-acting switch that protects the sensitive receiver from the high power of the transmitter. The duplexer 210 (or 260) includes two band-pass filers for the transmission-reception antenna 202 (or 252) and one band-pass filter for the exclusive reception antenna 204 (or 254), and these filters designed to receive both sets of the first and the second frequency. The transmitter 220 (or 270) amplifies the signal transmitted to the duplexer 210 (or 260). The main receiver 230 (or 280) includes a receiving amplifier 232 (or 282) for amplifying the received signal and a distributor 234 (or 284) for dividing the signal from the receiving amplifier into two channels. The auxiliary receiver 240 (or 290) includes a receiving amplifier 242 (or 292) for amplifying the signal received from the duplexer 210 (or 260) and a switch 244 (or 294) for selectively receiving the signal from the receiving amplifier 242 (or 292) or from the main receiver of the other Pico-BTS.

The switch 244 (or 294) is controlled by the operator of the Pico-BTS. For example, the operator can set to connect the switch to receive the signal from the exclusive reception antenna or from the main receiver of the other Pico-BTS, depending on whether one Pico-BTS works independently with the other Pico-BTS. The cable 10 (or 12) connects the part of the divided signal from the main receiver 230 (or 280) from one Pico-BTS to the auxiliary receiver 290 (or 240) of the other Pico-BTS.

In operation, if the first Pico-BTS 200 receives a signal through the transmission-reception antenna 202, the signal is delivered to the main receiver 230 through the duplexer 210, then the signal is amplified through the amplifier 232 and distributed by the distributor 234 into two channels. One of the distributed signals belonging to the first frequency channel is demodulated and the other is delivered through the external port ① to the external port ② of the auxiliary receiver 290 of the second Pico-BTS 250 that works dependently with the first Pico-BTS 200. Thus, the second Pico-BTS 250 receives the signal received by the main receiver 230 of the first Pico-BTS 200 through the transmission-reception antenna 202 and the signal through its own transmission-reception antenna 252 and main receiver 280 which is responsive to an inter-working relationship between the subordinate base stations. Thus, the second Pico-BTS 250 achieves the receiving diversity effect without using its own exclusive reception antenna 254. That is, the main receiver 230 (or 280) and the exclusive receiver 240 (or 290) are adapted for the purpose of the so-called diversity effect and carry out the same function without the need of the reception antenna 204 (or 254). Therefore, when the second Pico-BTS 250 is established to work dependently with the first Pico-BTS 200, the exclusive reception antenna 254 is not necessary.

Similarly, the auxiliary receiver 240 of the first Pico-BTS 200 receives the signal from the main receiver 280 of the second Pico-BTS. Namely, the signal received from the transmission reception antenna 252 of the second Pico-BTS 250 is distributed by the main receiver 280 into two channels. One portion of the distributed signal is delivered through the external port ③ of the second Pico-BTS 250 and the other portion is delivered through the cable 12 to the external port ④ of the first Pico-BTS 200 to the auxiliary receiver 240. In this case, the operator can set to control the switch 244 of the first Pico-BTS to make the connection with the external port ④. Thus, the first Pico-BTS 200 may also achieve the receiving diversity effect without using the exclusive reception antenna 204; therefore, only the transmission-reception antenna 202 is needed by establishing the first and second Pico-BTSs 200 and 250 to work dependently with each other. Thus, more than two subordinate base stations can achieve the receiving diversity effect without erecting the exclusive reception antenna, by using each other's transmission-reception antenna.

Another embodiment of the base station employing the multiple frequency channels is shown in FIG. 3. The first through the third Pico-BTS (300, 320 and 340) respectively define the first trough the third frequency channels. As the auxiliary receiver 312 of the first base station 300 receives the part of the signal from the main receiver 350 of the third Pico-BTS 340 through a cable 24, the first Pico-BTS 300 may achieve the receiving diversity effect as explained before without using the exclusive reception antenna 304. Likewise, the second and third Pico-BTSs 320 and 340 receive the signals from the main receivers of the first and second Pico-BTSs 300 and 320, respectively, and do not require the usage of the exclusive receiving antenna 324 and 344.

Another embodiment of the base station employing four frequency channels is shown in FIG. 4. As the first trough the fourth Pico-BTSs (400, 420, 440 and 460) are provided to receive the signal from each other's main receiver by the diversity effect, the base stations do not require the exclusive reception antenna (404, 424, 444 and 464). With this type of operation, the present invention provides the means for connecting a plurality of subordinate base stations to accommodate multiple frequency channels in the system without using the exclusive reception antenna (404, 424, 444 and 464).

While there have been illustrated and described what are considered to be the preferred embodiments of the present invention, it will be understood by those skilled in the art that various changes and modifications may be made, and equivalents may be substituted for elements thereof without departing from the true scope of the present invention. In addition, many modifications may be made to adapt to a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. An apparatus for receiving signals in a CDMA communication system, said apparatus comprising:
    a plurality of subordinate base stations, said each subordinate base station comprising:
        a transmission-reception antenna;
        a duplexer coupled to said antenna for transmitting and receiving a signal;
        a transmitter for transmitting the signal to said antenna via said duplexer;
        a first auxiliary receiver coupled to received the signal from said duplexer;
        a main receiver for receiving the signal from said antenna via said duplexer and for dividing the received signal from said antenna into two distinct channels, wherein one of the channels is transmitted from said main receiver of a first base station to a second auxiliary receiver of a second base station through an external port.

2. The apparatus as defined in claim 1, wherein said duplexer is designed to pass a plurality of different frequency channels.

3. The apparatus as defined in claim 1, wherein said main receiver comprises a receiving amplifier coupled to said duplexer and a distributor coupled to the output of said receiving amplifier for dividing the received signals from said amplifier into two distinct channels.

4. The apparatus as defined in claim 1, wherein said first auxiliary receiver comprises a receiving amplifier coupled to said duplexer and a switch for selectively receiving either the output signal from said receiving amplifier or the output signal from the external port of said second base station.

5. The apparatus as defined in claim 4, wherein said switch in said first base station is switched over to connect with said receiving amplifier of said first base station if there is no interworking relationship between said base stations, and wherein said switch in said first base station is switched over to connect the external port of said second base station in response to an interworking relationship between said base stations.

6. The apparatus as defined in claim 1, wherein each said base station further comprises an exclusive reception antenna for transmitting the signal to said auxiliary receiver, wherein said auxiliary receiver receives the signal from said exclusive reception antenna if there is no interworking relationship between said base stations.

7. An apparatus for receiving signals in a base station of a CDMA communication system, said apparatus comprising:
    a transmission-reception antenna;
    an exclusive reception antenna;
    a duplexer coupled to said transmission-reception antenna and said exclusive reception antenna, for transmitting and receiving a signal;
    a transmitter for transmitting the signal to said transmission-reception antenna via said duplexer;
    an auxiliary receiver coupled to receive the signal from either one of said exclusive reception antenna or an output signal transmitted from another base station; and,
    a main receiver for receiving the signal from said antenna via said duplexer and for transmitting a portion of the received signal from said base station to said another base station.

8. The apparatus as defined in claim 7, wherein said main receiver comprises a receiving amplifier coupled to the output of said duplexer, and a distributor coupled to the output of said receiving amplifier for dividing the received signal from said amplifier into two distinct channels.

9. The apparatus as defined in claim 7, wherein said auxiliary receiver comprises a receiving amplifier coupled to the output of said duplexer, and a switch for selectively switching over to connect either the output signal from said receiving amplifier or the portion of the received signal transmitted from said another base station.

10. The apparatus as defined in claim 8, wherein said switch in said base station is switched over to connect with said receiving amplifier in said base station if there is no interworking relationship between said base stations, and wherein said switch is switched over to connect the external port of said another base station in response to an interworking relationship between said base stations.

11. An apparatus as defined in claim 7, wherein said main receiver of said base station transmits the received signal to the auxiliary receiver of said another base station.

12. An apparatus for receiving signals in a base station of a CDMA communication system, said apparatus comprising:
    a transmitter for transmitting a signal to communicate with a mobile phone;
    a main receiver for receiving the signal to communicate with said mobile phone and for transmitting a portion of the received signal from said base station to another base station; and,
    an auxiliary receiver for receiving an output signal transmitted from said another base station.

13. An apparatus for transmitting and receiving signals in a base station of a CDMA communication system, said apparatus comprising:
    a main receiver for processing the signals received from a mobile phone via a first antenna and for transmitting a portion of the received signals to another base station; and
    an auxiliary receiver for processing the signals received from said another base station via a second antenna.

14. The apparatus as defined in claim 13, wherein said auxiliary receiver processes either one of the signals received through the first antenna of said one base station or the signals received through said second antenna of said another base station.

15. An apparatus for achieving an antenna diversity in a base station of a CDMA communication system, said apparatus comprising:
    a main receiver for processing a signal received from a mobile phone via a transmission-reception antenna;
    a first auxiliary receiver for processing either the signal received from said main receiver via said transmission-reception antenna or the signal received from an exclusive reception antenna; and,
    wherein the main receiver transmits a portion of the received signal to a second auxiliary receiver of another base station; and,
    wherein said first auxiliary receiver processes the signal received through a second transmission-reception antenna of said another base station.

* * * * *